April 17, 1962 H. JOHANSON ETAL Re. 25,159
APPARATUS FOR TEMPERATURE MEASUREMENT
Original Filed Jan. 26, 1955
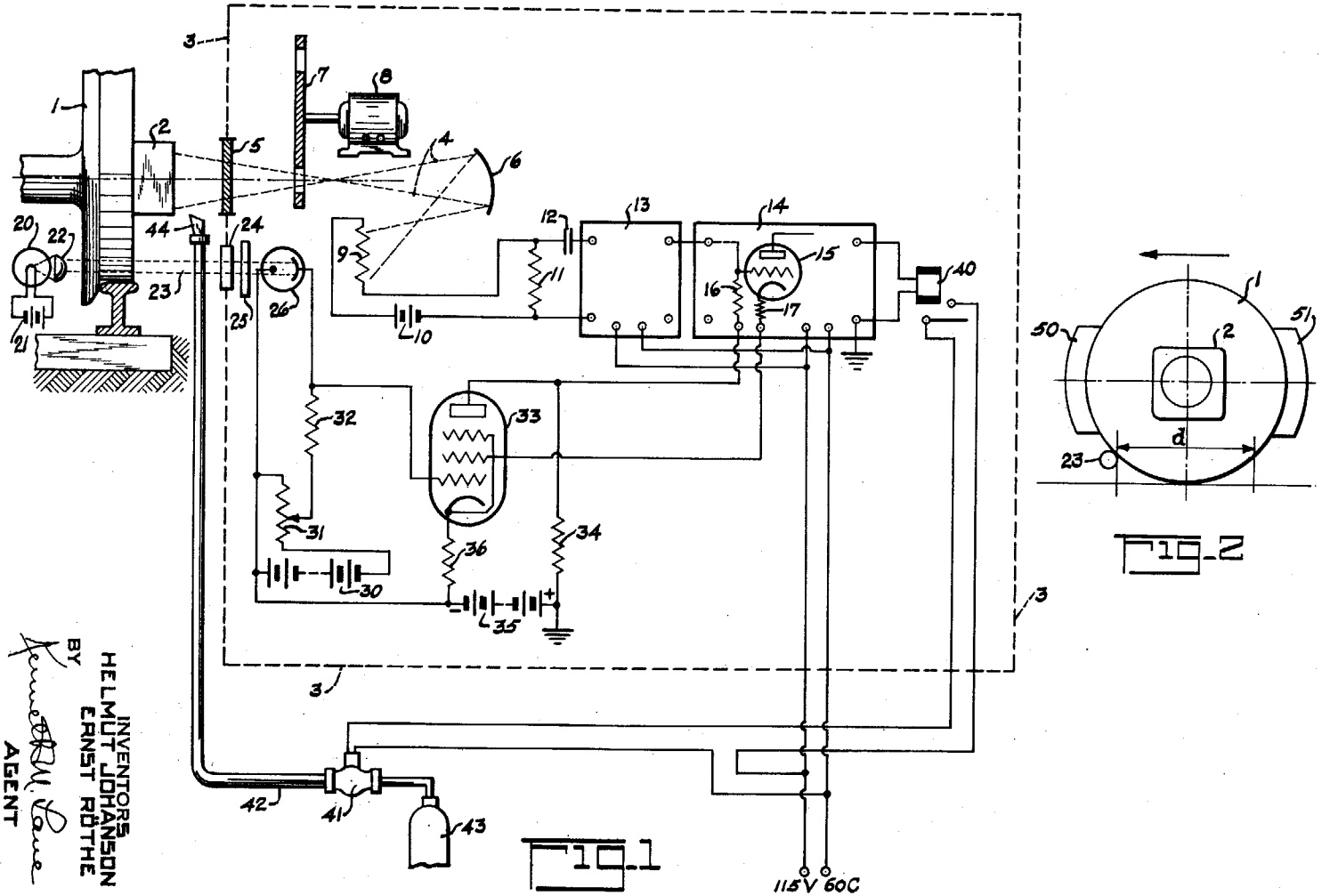
INVENTORS
HELMUT JOHANSON
ERNST RÖTHE
BY
Kenneth M. Lane
AGENT United States Patent Office Re. 25,159
Reissued Apr. 17, 1962

25,159

APPARATUS FOR TEMPERATURE MEASUREMENT

Helmut Johanson, Wiesbaden-Dotzheim, and Ernst Röthe, Bad Soden-Allendorf, Germany Original No. 2,818,508, dated Dec. 31, 1957, Ser. No. 484,284, Jan. 26, 1955. Application for reissue Dec. 18, 1959, Ser. No. 860,619
Claims priority, application Germany Jan. 28, 1954
7 Claims. (Cl. 246—169)

Matter enclosed in heavy brackets [ ] appears in the original patent but forms no part of this reissue specification; matter printed in italics indicates the additions made by reissue.

This invention relates to apparatus for measurement of temperatures of moving bodies and particularly to such apparatus in which temperatures are measured by means of a stationary infrared detector. The invention is especially useful in measuring temperatures of journal boxes on railway cars in movement.

In order to determine temperatures of journal boxes or wheel bearings on railway cars, in order to ascertain or prevent the development of socalled hot boxes, it is conventional practice to determine the temperatures of journal boxes either by hand or by providing separate temperature-sensitive elements in each journal box.

Manual determination is not only tedious but can also only be carried out when a vehicle is stationary. Provision of separate temperature elements at each bearing together with an associated equipment is complicated and costly.

It is an object, therefore, of the present invention to provide apparatus for measuring temperatures of moving bodies, such as wheels of railway cars, by means of single stationary apparatus.

A further object of the invention is to provide such apparatus for measuring the temperature of a particular zone of a moving body, such as the journal box associated with the wheel of a railway car, in the presence of zones of different temperatures, such as occasioned when brake shoes are pressed against the rim of a wheel.

Still a further object is to provide apparatus for automatically marking a wheel of excessive temperature.

In accordance with the present invention there is provided apparatus for detecting the temperature of one zone of a moving body having other adjacent zones with different temperatures, which comprises stationary means for intercepting infrared radiation emitted from the desired zone whose temperature is to be measured, and means for converting this radiation into electrical signals representative of this temperature. Means are also provided for amplifying these signals. [Another source of radiation and a detector are provided, so positioned that the body can interrupt the transmission of radiation therebetween during its movement. Circuit means are also provided for deriving from this source and detector electrical pulses which are substantially coincident with the intercepting of infrared radiation from the desired zone, as well as means]. *Means actuated by the passing of the moving bodies such as journal boxes are provided to produce pulses. Means are also provided* for rendering the amplifying means inoperative in the absence of such pulses. Finally, means can be provided, actuated by the electrical temperature signals automatically to mark bodies having excessive temperatures.

For a better understanding of the invention, together with other and further objects thereof, reference is had to the following description taken in connection with the accompanying drawing and its scope will be pointed out in the appended claims.

In the accompanying drawing, FIG. 1 is a schematic diagram of an arrangement for measuring the temperature of journal boxes of railway cars, in accordance with the present invention, while FIG. 2 shows the relative location of a railway car wheel and the beam of radiation used for control of the infrared signal amplifying means.

Referring now more particularly to FIG. 1, there is shown a railway car wheel 1 and its associated journal box 2. For receiving infrared radiation emitted by the journal box, there is provided apparatus in a housing generally indicated at 3, which is substantially water- and dustproof. For permitting infrared radiation indicated by the broken lines 4 to enter housing 3, there is provided a window 5 of infrared transmitting material through which radiation falls upon a reflecting and focusing mirror 6. For periodically interrupting the radiation and interruptor disc 7 is located, as shown, driven by a motor 8. Interrupted radiation falls upon an infrared-sensitive element 9, shown as a variable resistance, which can be a resistance element wound of very fine wire upon a core of very low mass, or can be a layer of lead sulphide on a support of low mass. It is of importance that the mass of the support for the radiation-sensitive element be relatively small, so as to produce a radiation detector having a high speed of response. Element 9 is connected in circuit with a battery 10 of, say about two volts and a resistor 11 across which small electrical signals representative of the temperature of journal box 2 are developed. Resistor 11 is capacitively coupled to a tuned amplifier 13 having a relatively wide band of transmission. The output of amplifier 13 is coupled to a unit 14, comprising further stages of amplification and a rectifier. One of the amplifier stages of unit 14 comprises a vacuum tube 15 having a grid resistor 16 and a cathode resistor 17.

For rendering unit 14 operative, since it is normally inoperative, there is provided a small incandescent lamp 20 powered by a battery 21, and located with respect to wheel 1, as shown. For focusing radiation from lamp 20, there is provided an optical system, indicated by the lens 22, which focuses a collimated beam 23 through a window 24 and a blue filter 25 upon a photocell 26. The blue filter 25 is provided to prevent the apparatus from being sensitive to variations in the intensity of the surrounding light, so that the apparatus is independent of day or night condition.

Associated with photocell 26 is a circuit including a battery 30, a potentiometer 31 and a load resistor 32, across which photoelectric signals are developed. For amplifying the photoelectric signals, there is provided a vacuum tube 33 with a load resistor 34, a battery 35, and a cathode resistor 36. The anode of tube 33 is connected to grid resistor 16 of tube 15, and the screen grid of tube 33 is connected to cathode resistor 17 of tube 15, as shown.

The rectified output of unit 14 is connected to a relay 40, whose contact is connected to the power line and the coil of a solenoid valve 41, as shown.

For automatically marking wheels whose temperature is in excess of a predetermined value, valve 41 is connected in a line 42 between a cylinder 43, containing paint under pressure, such as a Freon mixture containing paint, and a spray nozzle 44.

For powering units 13 and 14, they are connected to the power line, as shown, each unit containing its own rectifier for D.C. supply, as conventional. Obviously, wherever batteries are shown, rectifiers can equally well be used, as is well understood in the art.

FIG. 2 shows wheel 1 with brake shoes 50 and 51 and journal box 2. 23 indicates the collimated beam of radiation, previously described in connection with FIG. 1. Wheel 1 is shown in a particular location with respect to beam 23, which it is about to intercept, moving in the direction of the arrow. During the time it takes wheel 1 to cover the distance d, the beam 23 will be interrupted by the wheel.

The general operation of the invention is now described in connection with FIG. 1. Wheel 1 moves on a rail mounted on a cross tie located on an underbed, as shown. When wheel 1 has reached certain position, infrared radiation as indicated by lines 4 passes through window 5, falls upon mirror 6 and is reflected upon the temperature-sensitive element 9. The radiation is interrupted by disc 7 driven by synchronous motor 8 so as to obviate the necessity for a low level D.C. amplifier for amplifying signals developed across element 9.

The resistance of element 9 is varied with a periodicity depending on the speed of revolution of disc 7 and the number of openings therein. The amplitude of variations is in accordance with the temperature of journal box 2. Signals representative in amplitude to the temperature of 2 are capactively coupled to amplifier 13, which is tuned to a relatively narrow band around 300 cycles for per second so as to make the apparatus subtsantially insensitive to extraneous sources of radiation other than those represented by the journal boxes to be measured. For a journal box area of 20 sq. cm., a maximum train velocity of 46 km. per hour, and 6 interruptions of the infrared radiation, a signal frequency of 300 cycles per second is obtained. The output of amplifier 13, which is of conventional design, is applied to unit 14 containing the control amplifier stage with tube 15.

Normally, tube 15 is cut off as will now be described. Radiation from lamp 20, collimated by lens 24, passes through window 24, filter 25, and falls upon the cathode of photocell 26, as long as wheel 1 does not interrupt beam 23. As long as photocell 26 receives light and draws current, a positive potential is applied to the control grid of tube 33 making this tube highly conductive, thereby rendering its anode negative with respect to ground. This also places a negative potential upon the control grid of tube 15 and cuts off this tube. Hence, the infrared part of the system is inoperative as long as beam 23 is not interrupted by wheel 1.

The necessity for this arrangement can readily be seen from FIG. 2, which shows wheel 1, journal box 2, and brake shoes 50 and 51. During braking, temperatures can be be developed between the brake shoes and the wheel, which are as high or even considerably higher than the maximum permissible temperature of the journal box. Since radiation from box 2 is intercepted, radiation from brake shoes 50 and 51 is also intercepted and would lead to spurious indications. Therefore the apparatus is made insensitive until brake shoe 50 has passed by the point where its radiation is intercepted, and is again desensitized before brake shoe 51 enters the area where its radiation is intercepted. This is accomplished by so locating the collimated beam 23 that wheel 1 interrupts beam 23 after brake shoe 50 has passed, and only until brake shoe 51 is about to approach.

In this manner, the amplifying system for the infrared signals is made operative only during the time when radiation from journal box 2 is intercepted, and while the wheel travels approximately the distance d indicated in FIG. 2.

Referring again to FIG. 1, the rectified output of unit 14 is applied to relay 40 and when it assumes a temperture in excess of a predetermined value, the relay becomes energized and closes its contact. The temperature at which this occurs, can be adjusted by a conventional gain control in one of the units 13 or 14, as is well known in the art and, therefore, is not shown. When the contact of relay 40 is closed, voltage from the power line is applied to the coil of solenoid valve 41, opening this valve and permitting paint from cylinder 43 to pass through line 42 and be sprayed through nozzle 44 upon the journal box with excessive temperature. In this manner hot boxes are automatically marked and are readily recognizible.

While there has been described what is at present considered to be the preferred embodiment of this invention, it will be obvious to those skilled in the art that various changes and modifications may be made therein without departing from the [interventon,] *invention,* and it is, therefore, aimed in the appended claims to cover all such changes and modifications as fall within the true spirit and scope of the invention.

*In the claims the term "electronic gating means" issued in its narrower sense to cover an electronic circuit including an amplifying device such as a vacuum tube, transistor, etc. in which the flow of current is affected by the application of an electric potential or current to an electrode whereby the circuit is either in amplifying condition or is biased to cut off so that no amplification takes place. The term does not include a circuit in which ohmic conduction by means of electrons through a conductor is switched on or off.*

What is claimed is:

1. Apparatus for detecting the temperature of one zone of a moving body having other adjacent zones with different temperatures, comprising intercepting means for intercepting infrared radiation emitted from the desired zone whose temperature is to be measured, means for converting said intercepted radiation into electrical signals representative of said last-named temperature, means for amplifying said signals, a second source of radiation, a detector of said last-named radiation, said second source and said detector being so positioned that said body can interrupt said last-named radiation transmission therebetween during its movement, and circuit means for deriving from said second source and detector control signals substantially coincident with the interception of infrared radiation from said desired zone, and means for rendering said amplifying means inoperative in the absence of said control signals.

2. Apparatus for detecting the temperature of wheel bearings on moving vehicles with brake shoes operating on the outside wheel rims, comprising means for intercepting infrared energy from said bearings, means for converting said intercepted radiation into electrical signals representative of the temperature of said bearings, means for amplifying said signals, a second source of radiation positioned on one side of the wheel path, a detector positioned on the opposite side of said wheel path, circuit means for deriving from said detector control signals substantially coincident with the interception of infrared energy from said bearings, and means for rendering said amplifying means inoperative in the absence of said control signals.

3. Apparatus in accordance with claim 2, in which said source and said detector are positioned in a plane in the proximity of the lowest points on said brake shoes.

4. Apparatus in accordance with claim 2, including means actuated by said signals for visibly marking bearings having a measured temperature in excess of a predetermined value.

5. Apparatus as claimed in claim 1 wherein attenuating means are arranged between said intercepting means and said one zone of said moving body for preventing any infrared radiation emitted from said desired zone from reaching said intercepting means, wherever desired.

*6. Apparatus for detecting the temperature of one zone of a moving body having adjacent zones with different temperatures, comprising intercepting means for intercepting infrared radiation emitted from the desired zone whose temperature is to be measured, means for converting said intercepted radiation into electrical signals representative of said last named temperature, means for amplifying said signals, normally shut electronic gating means in the amplifying means, circuit means actuated by the passage of the moving body in passing through said desired zone and substantially coincident therewith for pro-*

*ducing control signals, means connecting the control signal circuit output to the electronic gating means in phase to open the electronic gating means by said control signals whereby the amplifying means is inoperative in the absence of actuation of the gating means by the control signals.*

*7. Apparatus as claimed in claim 6 in which the zone of the moving body is the bearings of a railway car wheel.*

References Cited in the file of this patent or the original patent

UNITED STATES PATENTS

| | | |
|---|---|---|
| 494,765 | Tyler | Apr. 4, 1893 |
| 1,824,108 | Abendroth | Sept. 22, 1931 |
| 1,880,149 | Neale | Sept. 27, 1932 |
| 2,089,835 | Logan | Aug. 10, 1937 |
| 2,237,193 | Mobsby | Apr. 1, 1941 |
| 2,466,751 | Thomson | Apr. 12, 1949 |

| | | |
|---|---|---|
| 2,486,753 | Miller | Nov. 1, 1 |
| 2,507,001 | Ferte | May 9, 1 |
| 2,522,348 | Dahline | Sept. 12, 1 |
| 2,532,566 | Millman | Dec. 5, 1 |
| 2,560,753 | Weinberg | July 17, 1 |
| 2,595,993 | Templeman et al. | May 6, 1 |
| 2,620,435 | Vogt et al. | Dec. 2, 1 |
| 2,631,273 | Bagno | Mar. 10, 1 |
| 2,640,152 | Hartwig | May 26, 1 |
| 2,681,989 | Cunniff | June 22, 1 |
| 2,714,160 | MacDougall | July 26, 1 |
| 2,856,539 | Orthuber et al. | Oct. 14, 1 |

OTHER REFERENCES

"Industrial Electronics," article appearing in the Ma 1949 edition of "Electronics," pages 112–114. (A co is located in 246–169(.1).)